Patented Apr. 7, 1942

2,278,684

UNITED STATES PATENT OFFICE 2,278,684

BITUMINOUS EMULSION

Willard C. Asbury and Frederic Horace Garner, London, England, assignors to Standard Oil Development Company, a corporation of Delaware No Drawing. Application March 29, 1940, Serial No. 326,664

6 Claims. (Cl. 106—277)

This invention relates to bituminous emulsions and more particularly to emulsions in which the dry films formed therefrom are rendered more resistant to water by the incorporation in the emulsions and in the films resulting therefrom of certain specific substances.

Emulsions of bituminous materials generally consist of an emulsifying agent, a bitumen and water which, upon application to a mineral aggregate, deposit the bituminous materials upon the mineral aggregate in a coherent film.

These bituminous films on drying do not readily tend to reemulsify when subjected to rain or dampness, but when subjected to a long period of rain or dampness, there is a tendency for the bituminous coating on the mineral aggregate to be removed and for the surface of the aggregate to be exposed with the result that the aggregate becomes loosened and holes are formed in the pavement.

The present invention relates to bituminous emulsions to which certain materials are added that tend to improve the adhesion qualities of the bituminous compounds to the mineral aggregate.

Certain materials that impart this improvement to the bituminous compounds are the salts of aluminium, tin, boron, chromium, zinc, molybdenum and vanadium in conjunction with aliphatic amines. Of the elements mentioned, aluminium and tin are the most effective. To illustrate the action of these salts and aliphatic amines, two emulsions containing n-heptadecylamine and sodium aluminate are shown. The first (a) contained 1% of n-heptadecylamine in the asphalt (% on asphalt) and 0.2% aluminum sulfate in the aqueous phase (% on emulsion), while the second (b) contained half of these quantities. Each emulsion contained approximately 55% asphalt, 0.5% Swedish liquid rosin soap, and sufficient alkali to react with the aluminum sulfate to form sodium aluminate and give 0.05% excess. Shaking test results were as follows:

TABLE I

| Emulsion | Condition of stones | Time of cure | Average time to 50% removal of asphalt |
|---|---|---|---|
|  |  | Hours | Minutes |
| (a) | Dry | 4 | 300 |
|  |  | 24 | 270 |
|  | Wet | 4 | 300 |
|  |  | 24 | 270 |
| (b) | Dry | 4 | 60 |
|  |  | 24 | 120 |
|  | Wet | 4 | 60 |
|  |  | 24 | 120 |

Comparison of these results with the results obtained with the standard emulsion and with the same quantities of each of the separate constituents is given in the following tables:

TABLE II

Average time to 50% removal of asphalt (minutes)

| Stones | Time of cure | I Standard | II 1% heptadecylamine | III 0.2% $Al_2(SO_4)_3$ aq. | IV II+III (calc.) | V 1% heptadecylamine+0.2% $Al_2(SO_4)_3$ aq. |
|---|---|---|---|---|---|---|
|  | Hours |  |  |  |  |  |
| Dry | 4 | 0.2 | 90 | 12.5 | 102.5 | 300 |
|  | 24 | 0.8 | 60 | 45 | 105 | 270 |
| Wet | 4 | 0.1 | 2.5 | 3.2 | 5.7 | 300 |
|  | 24 | 0.7 | 37.5 | 33.8 | 71.3 | 270 |

TABLE III

Average time to 50% removal of asphalt (minutes)

| Stones | Time of cure | Standard | 0.5% heptadecylamine | 0.1% $Al_2(SO_4)_3$ aq. | II+III (calc.) | 0.5% heptadecylamine+0.1% $Al_2(SO_4)_3$ aq. |
|---|---|---|---|---|---|---|
|  | Hours |  |  |  |  |  |
| Dry | 4 | 0.2 | 1 | 1.5 | 2.5 | 60 |
|  | 24 | 0.8 | 12.5 | 22.5 | 35 | 120 |
| Wet | 4 | 0.1 | 0.8 | 1 | 1.8 | 60 |
|  | 24 | 0.7 | 10 | 15 | 25 | 120 |

Column I shows the time in minutes (to 50% removal of asphalt) of the emulsion without either of the addition agents; column II the time in minutes with n-heptadecylamine; column III the time in minutes with $Al_2(SO_4)_3$ aq.; column IV the sum of columns II and III; and column V the time in minutes when the same percentage of n-heptadecylamine and $Al_2(SO_4)_3$ aq. are used together in the emulsion.

These results show the improvement effected by n-heptadecylamine and $Al_2(SO_4)_3$ aq. separately, and also, as indicated by columns IV and V, the effect produced when these two agents are used together. This latter is much greater than that obtained when either of these two agents is used separately. Thus, for example, 1% n-heptadecylamine produces an increase in time from 0.2–90 minutes, and 0.2% $Al_2(SO_4)_3$ aq. produces an increase in time from 0.2–12.5 minutes, so that the calculated effect for these percentages of these reagents used together would be 102.5 minutes, whereas the actual time observed was 300 minutes. It will further be noticed that the increase is particularly marked after the four hours' cure, and this is important since the four hours' cure corresponds more or less to the state reached on the road at the end of the day's work; at this stage rain may occur and consequently a reasonably high stripping time is desirable.

It is not intended to limit this invention to the salts of aluminum alone, as the salts of certain other elements, such as tin, boron, chromium, molybdenum, vanadium and zinc, may be used. It is also not intended to limit this invention to n-heptadecylamine alone as other amines may be used, such as the following:

(1) Primary, secondary, and tertiary aliphatic amines in which more than 11 carbon atoms are in a straight chain.

(2) Cyclic nitrogen compounds which have a substituted group containing a straight chain of at least 10 carbon atoms attached to a carbon atom in the ring. These are derived from the following classes of compounds:

(a) Amines of saturated or unsaturated cyclic hydrocarbons including aromatic hydrocarbons.

(b) Heterocyclic compounds containing a nitrogen atom in the ring.

We claim:

1. An aqueous emulsion of bitumen of the oil-in-water type containing an alkali metal salt the anion of which contains a metal selected from the group consisting of aluminium, tin, boron, chromium, molybdenum, vanadium and zinc, in conjunction with aliphatic amines possessing at least one aliphatic substituent of at least 11 carbon atoms.

2. An aqeous emulsion of bitumen of the oil-in-water type according to claim 1 in which the alkali metal salts are in conjunction with up to 2% of n-heptadecylamine.

3. An aqueous emulsion of bitumen of the oil-in-water type containing sodium aluminate and up to 2% of aliphatic amines possessing at least one aliphatic substituent of at least 11 carbon atoms.

4. An aqueous emulsion of bitumen of the oil-in-water type containing up to 1% of sodium aluminate in conjunction with up to 2% of aliphatic amines possessing at least one aliphatic substituent of at least 11 carbon atoms capable of rendering a dry film formed from the emulsion substantially resistant to water.

5. A bituminous coating on aggregate formed by the evaporation of water from an aqueous emulsion of bitumen of the oil-in-water type containing an alkali metal salt the anion of which contains an element selected from the group consisting of aluminium, tin, boron, chromium, molybdenum, vanadium and zinc in conjunction with aliphatic amines possessing at least one aliphatic substituent of at least 11 carbon atoms.

6. A bituminous coating on aggregate formed by the evaporation of water from an aqueous emulsion of bitumen of the oil-in-water type containing up to 1% of sodium aluminate in conjunction with up to 2% of n-heptadecylamine.

WILLARD C. ASBURY.
FREDERIC HORACE GARNER.